United States Patent
Klein et al.

(10) Patent No.: US 6,954,291 B2
(45) Date of Patent: Oct. 11, 2005

(54) METHOD, APPARATUS, AND COMPUTER PROGRAM FOR REDUCING PLATE MATERIAL WASTE IN FLEXOGRAPHY PLATE MAKING

(75) Inventors: Thomas Klein, Wolfenbuettel (DE); Hans Dewitte, Bruges (BE)

(73) Assignee: Esko-Graphics A/S, Ballerup (DK)

( * ) Notice: Subject to any disclaimer, the term of this patent is extended or adjusted under 35 U.S.C. 154(b) by 912 days.

(21) Appl. No.: 09/946,145

(22) Filed: Sep. 4, 2001

(65) Prior Publication Data

US 2003/0053138 A1 Mar. 20, 2003

(51) Int. Cl.$^7$ ............................................. G06K 15/00
(52) U.S. Cl. ..................................... 358/3.29; 358/3.31
(58) Field of Search ................................ 358/3.29, 3.3, 358/3.31, 3.32, 1.18, 464, 3; 430/22, 271.1, 273.1; 700/173; 101/376, 382.1, 401.1

(56) References Cited

U.S. PATENT DOCUMENTS

| | | | |
|---|---|---|---|
| RE34,859 E | * 2/1995 | Endo et al. ................. | 358/3.29 |
| 5,440,403 A | 8/1995 | Hashimoto et al. ......... | 358/444 |
| 5,715,750 A | 2/1998 | Goovaard ................. | 101/382.1 |
| 5,846,691 A | 12/1998 | Cusdin et al. .............. | 430/300 |
| 5,974,974 A | 11/1999 | Agnew et al. ........... | 101/401.1 |
| 6,058,839 A | 5/2000 | Frazzitta .................. | 101/401.1 |
| 6,079,329 A | 6/2000 | Goovaard et al. .......... | 101/376 |
| 6,085,653 A | 7/2000 | Goovaard et al. .......... | 101/376 |
| 2002/0025492 A1 | 2/2002 | Murphey et al. ........ | 430/271.1 |

FOREIGN PATENT DOCUMENTS

| | | | | |
|---|---|---|---|---|
| EP | 0 788 272 A1 | 8/1997 | ............ | H04N/1/00 |
| JP | 05307255 | * 11/1993 | | |
| JP | 06230552 | * 8/1994 | | |
| WO | WO0145951 | 6/2001 | ........... | B41F/27/12 |

OTHER PUBLICATIONS

Web Brochure, Kongsburg FC1309 and FC1318 Samplemakers, Barco Graphics, Gent, Belgium, Downloaded from http://unix.barco.com/graphics/packaging/products/.
Web Brochure, DuPont Cyrel Macroflex, from http://www-.cyrel.dupont.com/.

* cited by examiner

Primary Examiner—Thomas D. Lee
(74) Attorney, Agent, or Firm—Dov Rosenfeld; Inventek

(57) ABSTRACT

Full-format screened data is processed in a computer-implemented method to identify zones that contain printable information. The zones are packed, imaged and made into flexo plates, and elements cut out from the plates for each zone of printable information. The plates use less flexo material than the full-format screened data. The cut elements are accurately placed on a flexo plate carrier to form a set of plates on a carrier for printing the full format screened data.

16 Claims, 2 Drawing Sheets

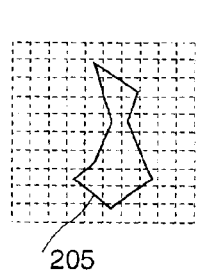
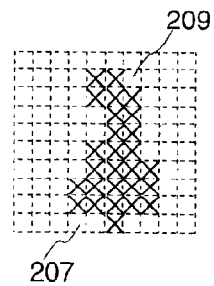
FIG. 2A
FIG. 2B
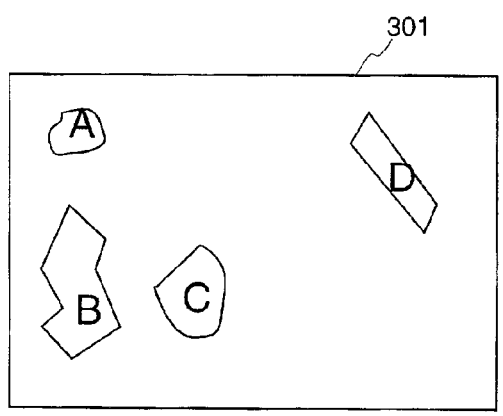
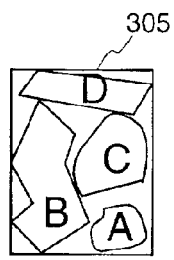
FIG. 3A
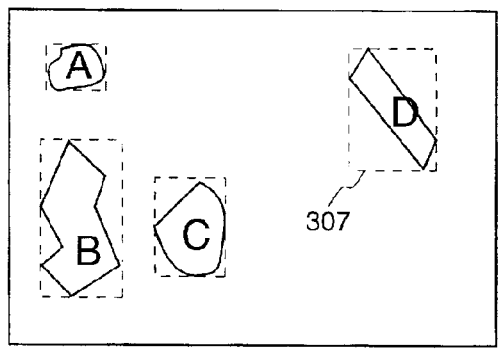
FIG. 3B
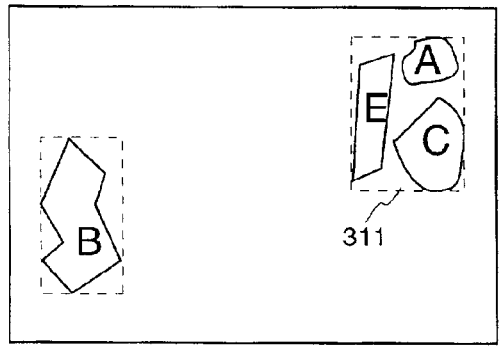
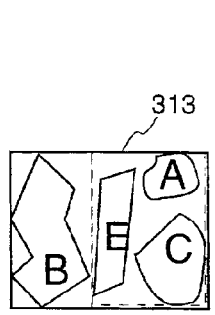
FIG. 3C

METHOD, APPARATUS, AND COMPUTER PROGRAM FOR REDUCING PLATE MATERIAL WASTE IN FLEXOGRAPHY PLATE MAKING

TECHNICAL FIELD OF THE INVENTION

The invention relates to printing, and in particular to reducing plate material waste in flexography plate making.

BACKGROUND

Flexography is today one of the most important processes for printing, particularly for printing for packaging. It uses a flexible photopolymer or rubber printing plate that carries the printing image in relief. The ink delivery system for flexography is achieved via an "anilox" engraved transfer roll.

A photopolymer flexo printing plate is either produced by a process that includes exposing a film on an imagesetter and using the film to expose and process a flexo printing plate, or by the computer-to-plate CTP process.

In the a film-based process, a film negative or positive is imaged in an imagesetter, the film is laid over the photopolymer flexographic plate, and the plate is exposed through the film using ultraviolet (UV) radiation to transfer the imaging information from the film to the plate. The flexo plate is then processed to remove the unexposed areas and generate a three-dimensional relief carrying the image (printing) information.

In a computer-to-plate process, no film is used. The photopolymer flexo plate is made photo-sensitive, typically by laminating a very thin—3 µm or so—black carbon, laser-ablatable layer over a flexo plate. Such a plate is sometimes called a "digital" flexo plate. The carbon layer is sensitive to high power thermal laser light. Therefore, the imaging information is transferred directly to the flexo plate using an imagesetter containing a high power laser source. The flexo plate may now be exposed to UV radiation, the unablated material washed, and the plate further processed in a manner similar to that for a film-based process.

Flexo plates are today expensive compared to other printing media, for example offset printing plates or film. It is therefore desirable to reduce flexo plate waste. Such waste may be severe in applications where only a fraction of overall image is covered by printing information. One application with such sparse images is the printing of corrugated material such as used for making corrugated paper packages, such as boxes. Only roughly 20–30% or even less of a full-format flexo plate for such a printing application might contain printable information, so that about 70–80% of such a full format flexo plate might be used not for transferring printing information, but rather for carrying those parts that do contain imaging information and keeping those parts in accurate relative positions, i.e., in registration.

There thus is an incentive to reduce such waste. One prior-art method to reduce plate waste in flexography is described in U.S. Pat. No. 5,846,691 to Cusdin, et al. (issued Dec. 8, 1998). Prior to imaging, only those elements of the flexo plate that will receive printing information are pre-mounted on the correct position on a suitable carrier sheet. After mounting, the printing information is transferred to flexo plate "patches" on the carrier sheet.

The Cusdin, et al. method has some serious shortcomings. The plate patches are already mounted on a full-format carrier sheet prior to entering the UV exposer, washer, dryer and finisher units. Imagine a corrugated box that might be two meters wide when flattened out to a sheet. To expose and process such a large sheet presents difficulty. Full format imagesetting and processing equipment is very expensive, so using such equipment to print a small part of the overall sheet seems wasteful. Furthermore, carrier sheets are prone to shrinkage/expansion as a result of one or more of the chemical washing, the exposing to intense UV light, and the exposing to heat in a dryer unit. Furthermore, adhesive tape typically is used to adhere the plate patches on the carrier sheet, and such tape can be destroyed during processing. Usually, a time-consuming plate-edge sealing step is therefore added.

Imaging of flexo plates is usually carried out on an external drum imagesetter. When a carrier sheet carrying flexo plate patches, such as produced by the Cusdin, et al. method is thus imaged, serious balancing problems may occur.

Finally, the method of Cusdin is typically practical only for a computer to plate method. Film copying over a patched carrier sheet is almost impossible to execute since the film to plate patch combination cannot be sucked by vacuum, which is required in a typical film-based process.

Thus there is a need for an alternate to patching plate materials on a carrier prior to imaging.

Another known method to reduce plate wastage is called "post-mounting" herein. A full-format film of the design is imaged, and afterwards the film parts that contain information are manually cut out. Only these cut film parts are used to image small flexo plate parts (patches). Producing the patches can use smaller less expensive imaging and processing equipment. The patches are then mounted post-exposure and post-processing in correctly registered positions on a stable carrier sheet, e.g., a Mylar sheet or a flexographic sleeve, using either two-sided tape or another adhesive material. Registering and mounting the patches is aided by special mounting support devices that typically include two or more video cameras and monitors for registering printed register marks. Examples of mounting devices include the Cyrel® Macroflex mounting device from E. I. Du Pont de Nemours and Company, Wilmington, Del. and the Mount-O-Matic® series of plate mounting machines produced by AV Flexologic NV, Alphen aan den Rijn, the Netherlands. Optical devices using duplicate drums and a mirror also are known to help mount the patches.

Such registration devices are expensive. The registration is completely manual because the cutting process is typically inaccurate. It is desired to eventually automate the whole process, including keeping track of relative positioning of the individual patches.

A known variant of the post-mounting method is to cut out the patches "electronically" on a computer aided design station rather than from a large film. The plate parts that contain print information are manually identified by an operator on a computer screen. Identification of the patches takes place when the print job data is still in editable file format (e.g. PostScript, PDF or similar formats). The individual plate patches—still stored in editable data format—are individually sent through a raster image processor (RIP) to convert them into a format that can be output to a film imagesetter or a computer-to-plate device. The parts are then imaged and processed individually prior to mounting.

Because each plate patch is sent through the RIP individually, screening starts new at each individual patch. The screening pattern produced by a RIP only repeats with the dimension of a so-called screening super-cell, so the screening of an individual patch typically will look slightly different from the screening pattern of the corresponding area in a full-format job. This can result in printing artifacts. For example, one of the separations, e.g., the black separation may be ripped full-format to provide a highly accurate mounting reference, while the other separations, e.g. cyan, magenta and yellow are cut into patches to save plate material. The screens of the full-format plate and the plate patches may then not properly match.

Another disadvantage of "electronic cutting" methods has to do with workflow. Preparing of the patches needs to be carried out in the pre-press department of the trade shop or at the printer. However, know-how of which job design should be separated into which plate patches to maximize print quality and plate making productivity typically resides only in the platemaking department. Thus inefficiencies and lack of security about final quality arise.

Finally, in many workflows, the platemaking operator has no access to editable image data. Typically, ready-made "digital film" files are sent over a high-speed network connection or over an digital medium like CD-ROM.

There thus is a need to reduce wastage of flexo plate material while using the image data produced in the pre-press department, e.g., using the screened full-format files that described the final printed result.

SUMMARY

Disclosed herein is a method for reducing plate material waste in flexography plate making. The full-format screened data is processed in a computer-implemented method to identify zones that contain printable information. The zones are packed, imaged and made into flexo plates, and elements cut out from the plates for each zone of printable information. The plates use less flexo material than the full-format screened data. The cut elements are accurately placed on a flexo plate carrier to form a set of plates on a carrier for printing the full format screened data.

Compared to the prior art, this method produces following advantages:

No access to editable data is needed.

The resulting printing information is unchanged, the method only removes parts that don't print anyway, while not touching the printing parts at all (remark that the prior art method changes the screening pattern).

The method is more automatic. There is no user intervention needed to determine what elements are taken together to define the plate patches. Also the placement of the patches on the flexographic sheet may be automated.

Plate patches for different separations can be unrelated, which saves far more flexo plate than when the patches must appear in all separations.

In one embodiment, the full-format design for flexography printing (a "flexo job") is transferred through a raster image processor (RIP) to generate the full-format screened data that could be directly sent to a film imagesetter or to a computer-to-plate (CTP) flexo imagesetter.

BRIEF DESCRIPTION OF THE DRAWINGS

The invention will now be described in more detail with the help of the following drawings:

FIG. 2A shows a single element with an overlay to illustrate how the image is tiled while FIG. 2B shows those tiles of FIG. 2A that include non-white image data.

FIGS. 3A and 3B show an example of two different packing methods, that differ in the way rotation is permitted (no rotation, arbitrary rotation, or rotation by ±90° or 180° allowed) and whether or not a bounding box is used.

FIG. 3C shows a packing method embodiment with a minimum zone size. FIG. 3C is also used to describe how the forming of patches may be manually changed according to one embodiment of the invention.

DETAILED DESCRIPTION

Figure 1:
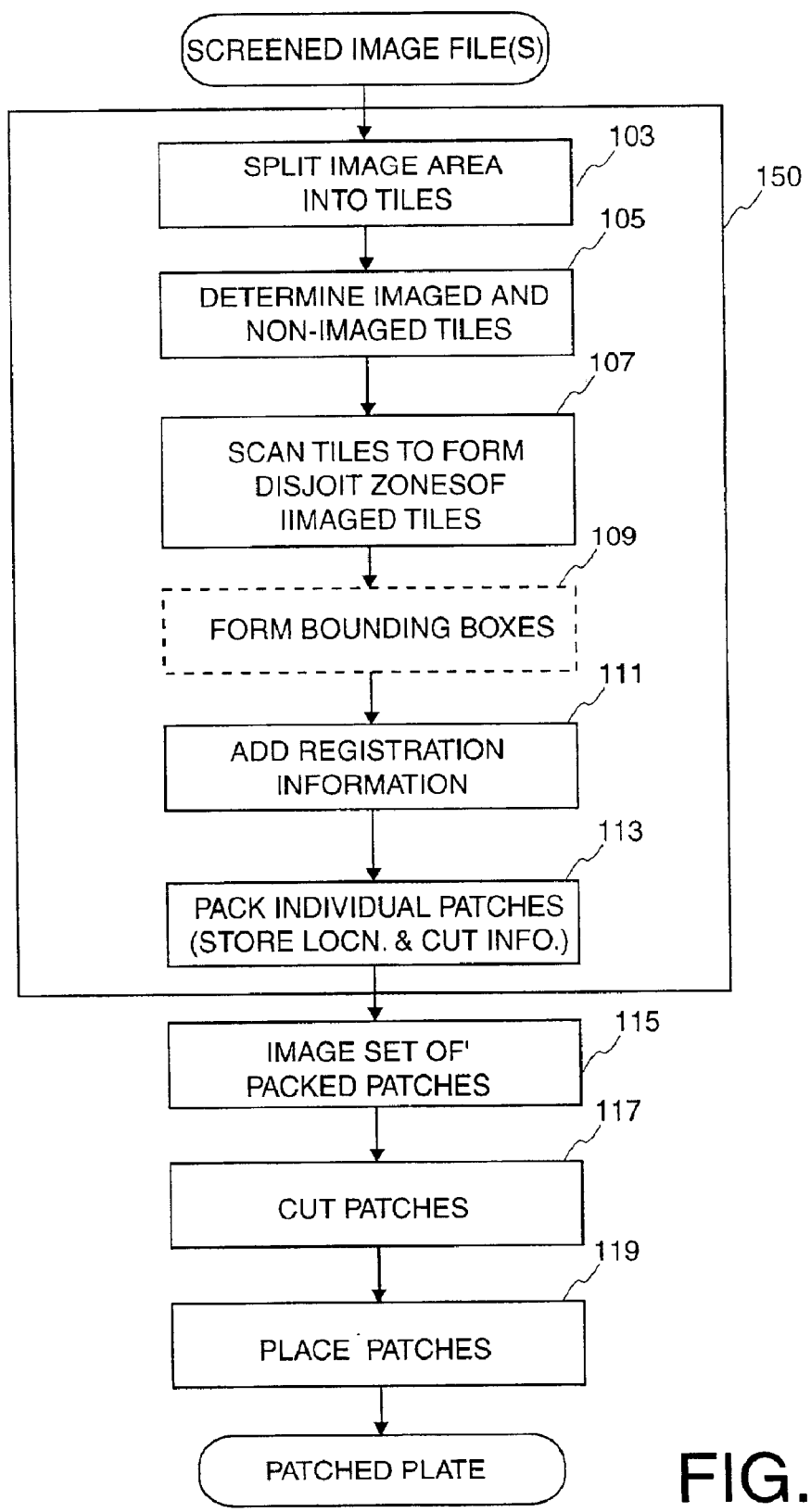
FIG. 1 is a flow chart illustrating one embodiment of the method of the invention. Also shown in FIG. 1 is a carrier medium embodiment of the invention.

In one embodiment, a full-format flexo job is processed by a raster image processor (RIP) to generate full-format screened data suitable to output to a film imagesetter or a computer-to-plate (CTP) flexo imagesetter. The screened data may be monochrome, or may have several color components. Each color is processed one-by-one.

In another embodiment, the image data is provided in the form of full-format screened data of color image files. The image data may be compressed.

Thus, the starting point is a set of one or more screened image files.

The processing is carried out on a computer, which may be any general-purpose computer. The method is implemented as a computer program that may be part of a design system, or may be part of an image preparation system for processing flexographic image files.

One embodiment of the method is illustrated in FIG. 1. The first step is to identify the disjoined imaged areas in the image data. This may be done either by determining the white space in each of the images, or by determining the complement of the white areas: the imaged areas.

Because the image data is of screened images, searching for the individual areas should be done at a resolution larger than that of the screening. That is, any search for white space (or covered image areas) should be a search for "gross" white space (or the opposite), for example features that are in the order of millimeters, not micrometers.

In one embodiment, referring to FIG. 1, the image area is tiled (step 103) into square tiles that have sides of length approximately 1 cm. FIG. 2A shows one region 200 of one of the image files with a single non-white element whose outline is shown as 205. The tiling is shown by the broken lines. In one embodiment, each of the tiles is classified in step 105 into one of two groups: covered by one or more non-white pixels, or all white. In FIG. 2B, those tiles of region 203 that have a non-white pixel are marked with an X.

The set of tiles is now grouped into a set of disjoined non-white zones containing connected non-white tiles. Many methods are available to so determine the non-white disjoined zones. One method (step 107) scans the tiles in some order, for example from top left to bottom right in rows. The first non-white tile encountered is annotated by a marking, for example a number. In one embodiment, the first annotation is the number 1. The scan continues until the next non-white tile is encountered. The eight neighbors of the next found tile are examined one-by-one. If the next found non-white tile touches a previously encountered non-white tile, then that tile is given the same annotation as the previously encountered tile. If there is no previously encountered tile, the newly encountered tile is given the next annotation, e.g., the next available number. If there are two or more previously encountered tiles, then the same previously assigned marking of one of the touching tiles is given to all the other touching tiles. That is, two or more previously assigned markings are made equivalent. One method now searches for equivalently marked tiles, ensures that the same marking is assigned, including if necessary changing the marking or markings, and then frees any not-used markings to the available markings.

When the last tile, e.g., the bottom right tile is examined, the forming of zones is complete. Each group of tiles that with the same marking, e.g., that has the same number assigned, is a single disjoined zone.

In one embodiment, each zone is required to have a pre-defined minimum size. According to the predefined size embodiment, a user selects a predefined size or a default pre-defined size is used. Any zone that is smaller than the predefined size is combined with the nearest zone to form a larger zone. According to another embodiment, each zone is further required to have an aspect ratio that is pre-defined or as some restriction imposed.

The next set of one or more steps is to pack the zones into a smaller area (step 113). The transform for packing, i.e., how each zone is translated and possibly rotated is known. However, once the individual patches each of a zone are cut, the relative positioning of each in the original image file is no longer known. Thus, in one embodiment, two or more registration marks are added (step 111) to each zone prior to the packing of the zones into small areas to be imaged. The registration marks are used for placing the individual patches once they are cut after imaging and processing in the correct position according to the original location prior to packing.

The registration mark adding method (step 111) depends on the packing method used. One packing embodiment first determines (step 109, shown in dotted box because it is only for the bounding box embodiment) the bounding box of each zone prior to packing, and then packs the bounding boxes (step 113, the bounding box version). When two bounding boxes overlap, a bounding box is formed of the union of the two overlapping boxes.

For the bounding box embodiment, there typically are two or more tiles that are part of the bounding box where there is no imaging data. The two or more registration marks in one embodiment are added in such bounded white tiles, or, in another embodiment, are added outside the original bounding box area.

Another packing embodiment packs the zones (step 113) in their original typically irregular shape (see the zone of X's in FIG. 2B). In such an embodiment, two or more additional previously white tiles are added to the zone with registration marks as part of step 111. Two such added tiles are shown as tiles 207 and 209 in FIG. 2B.

In one embodiment of step 111, only two registration marks are added, each in a tile where no imaging data exists. Two registration marks are sufficient for two-dimensional positioning. One registration mark provides for setting of the correct origin while the second provides for correct rotation.

In an improved embodiment of step 111, three registration marks are provided. The third registration mark provides for correcting of any deformation, e.g., shrinkage or expansion that may have occurred in the processing prior to placing of the patches. IN another embodiment, four registration marks are used, one of each side of the bounding box, usually in the middle of each edge and outside the original bounding box. The number of registration marks typically depends on the aspect ratio of the bounding box. For elements that are narrow, e.g., much higher than broad, typically four marks are used for accurate positioning with a mounting system.

Some alternate embodiments also include adding cutting marks as part of step 111. Such cutting marks are added in a manner similar to how registration marks are added.

The packing can now proceed. Various packing methods are known in the art. The goal in general is to pack the zones into a rectangular area that is as small as possible to minimize waste. However, some constraints may be added, such as constraints on the cutting patterns required to cut the individual patches and constraints on the final dimension of the rectangular packed images. When the original flexo job is in color, i.e., there are a set of full-format screened images, any rotation of the zones is carried out for all corresponding separations to ensure that the geometrical properties are maintained in the packed data. Flexo plates may get deformed during processing. One simple embodiment does not permit packing that includes rotation.

Flexographic plates are typically available in a small number of sizes. Furthermore, some sizes may be produced in larger numbers and may thus be less expensive. Furthermore plates of one size or another may be preferable for a particular job, for example because of availability of particular imaging or processing equipment, thus, one implementation allows for the operator to input a preferred set of one or more flexo plate sizes.

How to optimally pack a set of two-dimensional shapes into another larger shape is a well-known problem in the field of geometry and computer science, and is encountered often in industry. In the field of computer aided design, the problem is often called the "nesting" problem, and software for automatic nesting is well known. Commercial nesting software is made and marketed, for example, by Nester Software technologies, Inc. of Tel-Aviv, Israel and Waleska, GA. The nesting may include rotation, or rotation may be restricted. The nesting also may be carried after bounding boxes are first placed around the areas. While using bounding boxes may be a little wasteful of plate material, the resulting cutting pattern may be simpler and preferable.

FIGS. 3A, 3B and 3C shows three versions of the packing. FIG. 3A shows a packing algorithm that includes arbitrary rotation and without bounding boxes. The original full size image 301 includes the zones A, B, C and D. It is to be understood that each of the zones A, B, C and D have boundaries that are jagged due to the tiling, but the tiling is not visible at the scale shown. The packed rectangular area is shown as 305.

FIG. 3B shows a bounding box version starting with the same initial image with A, B, C and D. Step 109 places bounding boxes, for example, bounding box 307. The packing algorithm shown is of bounding boxes with no rotation permitted. The final rectangular area of the packed bounding boxes is shown as 309. Other versions may allow rotation, but only in units of 90-degrees.

FIG. 3C shows a bounding box version with a minimum zone (bounding box) size. In this example, suppose areas A, C and E each have a bounding box that is smaller than the pre-defined minimum size. After the bounding boxes are formed, a larger bounding box 311 is formed that has a size larger than the predefined minimum. The packed result is shown on the right in rectangle 313.

While in one implementation the packing is done automatically, it is desirable to also allow an operator to modify the packing. Thus, one embodiment includes automatic packing together with optional packing modification ("editing") by an operator manipulating graphic representations of the zones on a computer screen. Another version permits totally manual packing wherein the operator manipulates graphic representations of the zones on a computer screen.

In one embodiment, not only the packing is modifiable by the operator, but also the partitioning into distinct zones that form the patches. To show an example, consider FIG. 3C again and suppose that no minimum size is pre-defined for automatic zone creation. Suppose after review, the operator notices that three zones are close together in this image, so that efficient partitioning is achievable by grouping the distinct zones A, C and E together. In this case, bounding boxes are used, so the operator modifies the partitioning so that a single bounding box 311 is used to include A, C and E.

Once the groups of patches are formed in small rectangular areas each corresponding to a plate, the data files for each plate are imaged. These files can now either be sent directly to a film or CTP imagesetter one after the other, or, in another embodiment, the resulting data files can be combined to a new data file, format-wise fitting to the maximum film/plate size that can be processed by the film/CTP imagesetter.

Alternatively, the generation of the final data file, that is used for imaging, can be performed on the fly, i.e. without the interim step to generate a separate data file for each element.

Thus, once the packed images are available, they can be imaged to form imaged zones and plates formed of the imaged zones (step 115). The imaged zones on the plates are then cut to form plate elements (step 117). Various embodiments provide for cutting at various stages of the platemaking process. The plates may be cut after being imaged, or alternately after UV-exposure, or alternately after final processing.

In step 119, the cut plate elements are placed on a suitable carrier or flexo sleeve to form the plates for printing.

During the packing, the position data each of the patches relative to the original position on the image is recorded in a format suitable to drive a post-mounting support device, such the above mentioned mounting devices—the DuPont Macroflex or AV Flexologic post-mounter (Mount-O-Matic®)—to support post-mounting the plate elements on the carrier sheet or flexo sleeve in a register-accurate position.

In an alternate embodiment, the positioning information of the patches are printed out on a large format plotter/proofer to aid correct positioning of the patches.

Another embodiment adds cutting information electronically after or as part of the packing step. The cutting information may be transferred to an automatic cutting table, such one of the KONGSBERG® line of sample makers by Barco Graphics, NV, of Belgium, the assignee of the present invention. These cutting tables are used in the carton industry for both cutting and generating folding score lines. A wide variety of tools may be incorporated and a wide variety of materials may be placed on the table and accurately cut from computer generated cutting data.

The disclosed method assures that the generation of the plate patches can be completely transferred to the plate making department of trade-shops or printers, because it becomes completely independent from the pre-press design process.

Furthermore, it ensures that the screening dots on the individual plate patches have the same pixel information as the screening of the corresponding full-format data file, thus providing a screening match between all patches when printed as a set of colors. Such screen matching occurs even if one of the separations is imaged in full-format, and the other separations parts are imaged as patches.

Note that the disclosure above describes starting with one original image of one or more full size screened images and forming plates of at least some of the screened images. Thus, according to one embodiment, a color separation of a single image leads to one or more packed plates. In another embodiment, one can start with more than one original images, each including one or more full-format screened images. Each packed set can be from different images, i.e., the parts corresponding to one original image may be packed together with the parts from another original image. The computer program implementing the method keeps track of what part belongs to what image to correctly place the parts. Furthermore, the parts packed together need not be of the same color. For example, the parts of a number of monochrome images, each of a different color, may be packed onto one plate. Thus, in general, the method starts with a number N of full-format screened images and ends with M packed images such that the area of the M images is less than the area of the N images.

Note that while the method of the invention is most useful for flexography, it also might be useful for other printing methods, e.g., for printing on a letterpress. While today a letterpress is typically not used for sparse wide-format printing, it may be in the future.

One embodiment of the invention is a method implemented as a computer program that runs on a computer processing system. The computer program may be part of a computer software product (i.e., a carrier medium) that includes one or more code segments that cause a processor of a processing system to carry out the steps of the method described above. The program operates on one or more original images and generates computer data for forming the images of packed regions. FIG. 1 shows one embodiment 150 of the carrier medium. Each of the blocks within carrier medium that was previously described as a step of a method may be interpreted as one or more code segments that instruct the processor to implement the step.

Thus, as will be appreciated by those skilled in the art, embodiments of the present invention may be embodied as a method, an apparatus such as a data processing system, or a carrier medium, e.g., a computer program product carrying code segments that instruct a processor to implement steps. Accordingly, the present invention may take the form of an entirely hardware embodiment, an entirely software embodiment or an embodiment combining software and hardware aspects. Furthermore, the present invention may take the form of carrier medium, e.g., a computer program product on a computer-readable storage medium having computer-readable program code embodied in the medium. Any suitable computer readable medium may be used including a magnetic storage device such as a diskette or a hard disk, or an optical storage device such as a CD-ROM.

It will be understood that the steps of methods and flowcharts discussed are performed in one embodiment by an appropriate processor executing instructions (code segments) stored in storage. Thus, the steps in the flowchart may be replaced by means for carrying out the steps, such means including one or more processors. It will also be understood that the invention is not limited to any particular implementation or programming technique and that the invention may be implemented using any appropriate techniques for implementing the functionality described herein. The invention is not limited to any particular programming language or operating system.

The instructions (computer readable code segments) in storage may be read from storage into a memory of the computer system. Execution of sequences of instructions contained in memory causes the processor of the computer system to perform the process steps described herein. In alternative embodiments, hard-wired circuitry may be used in place of or in combination with software instructions to implement the invention. Thus, embodiments of the invention are not limited to any specific combination of hardware circuitry and software.

The terms "carrier medium" and "computer-readable medium" as used herein refer to any medium that participates in providing instructions to a processor for execution. Such a medium may take many forms, including but not limited to, non-volatile media, volatile media, and transmission media. Non-volatile media includes, for example, optical or magnetic disks, such as a storage device which is part of mass storage. Volatile media includes dynamic memory such as RAM. Transmission media include coaxial cables, copper wire and fiber optics, including the wires that comprise a bus within a computer. Transmission media can also take the form of acoustic or light waves, such as those generated during radio-wave and infra-red data communications.

Common forms of computer-readable media include, for example a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector coupled to a bus can receive the data carried in the infrared signal and place the data on the bus. The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN, or the Internet.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

What is claimed is:

1. A method of reducing plate material in plate making, comprising the steps of:
   scanning one or more original images, each original image including one or more full-format screened images for making plates of distinct colors for printing the original image, the scanning being of at least one of the full format screened images of each original image for disjoint elements that contain image information, the scanning forming disjoint zones of the scanned full format screened images, and
   packing one or more zones to form a set of one or more packed images. each packed image including at least one zone and suitable to be sent to a film imagesetter or a computer-to-plate imagesetter such that the area of all the packed images cover less plate area than the scanned full-format screened images, such that when the packed images are made into plates, the zones on each plate are cut, and the cut zones of each original image of each color are accurately placed on a full size carrier, the screening properties of the cut and placed zones are substantially the same as those of the corresponding full-format screened images in the original image.

2. A method as recited in claim 1, further comprising:
   sending a full-format job through a raster image processor (RIP) to generate at least one full-format screened image.

3. A method as recited in claim 1, wherein each zone has a pre-defined minimum size.

4. A method as recited in claim 1, wherein each zone has a predefined or in either way limited aspect ratio.

5. A method as recited in claim 1, further comprising:
   adding two or more registration marks to each zone prior to packing.

6. A method as recited in claim 1, further comprising:
   providing one or more predefined dimensions for the packed images such that each packed image is of one of the predefined dimensions.

7. A method as recited in claim 1, wherein the scanning step includes:
   tiling each original screened image into tiles of a dimension larger than the screen size;
   determining whether or not each tile contains non-white image data; and
   combining contiguous tiles containing non-white image data to form disjoint zones containing tiles with non-white image data.

8. A method as recited in claim 1, wherein the scanning step further includes:
   determining the bounding box of each zone of tiles containing non-white image data.

9. A method as recited in claim 1, wherein at least one of the full-format screened images for at least one of the original images are not scanned such that the full-format screened image of at least one color of at least one original image is to remain unprocessed.

10. A method as recited in claim 1, wherein each packed image is of zones from one or more full format screened images of the same color.

11. A method as recited in claim 1, further comprising:
   imaging the packed images to form imaged zones;
   forming plates of the imaged zones; and
   cutting the imaged zones on the plates to form plate elements.

12. A method as recited in claim 11, further comprising storing the positions of each of the zones on each original image to enable register-accurate post-mounting of the elements onto a carrier.

13. A method as recited in claim 1, further comprising:
   storing the cutting positions for each of the zones on each packed image such that the cutting information is transferable to a cutting table to automatically cut out one or more imaged zones on plates formed by imaging the packed images to form the imaged zones and forming the plates of the imaged zones.

14. A method as recited in claim 13, further comprising storing the positions of each of the zones on each original image to enable register-accurate post-mounting of the elements onto a carrier.

15. A method as recited in claim 1, wherein the plate making is for flexography.

16. A carrier medium carrying computer readable code segments to instruct one or more processors of a processing system to carry out a method of reducing plate material in plate making, the medium comprising:

one or more code segments to instruct the one or more processors to scan one or more original images, each original image including one or more full-format screened images for making plates of distinct colors for printing the original image, the scanning being of at least one of the full format screened images of each original image for disjoint elements that contain image information, the scanning forming disjoint zones of the scanned full format screened images, and one or more code segments to instruct the one or more processors to pack one or more zones to form a set of one or more packed images, each packed image including at least one zone and suitable to be sent to a film imagesetter or a computer-to-plate imagesetter such that the area of all the packed images cover less plate area than the scanned full-format screened images, such that when the packed images are made into plates, the zones on each plate are cut, and the cut zones of each original image of each color are accurately placed on a full size carrier, the screening properties of the cut and placed zones are substantially the same as those of the corresponding full-format screened images in the original image.

* * * * *

UNITED STATES PATENT AND TRADEMARK OFFICE
CERTIFICATE OF CORRECTION

PATENT NO. : 6,954,291 B2
DATED : October 11, 2005
INVENTOR(S) : Klein et al.

It is certified that error appears in the above-identified patent and that said Letters Patent is hereby corrected as shown below:

Column 10,
Line 6, kindly change "packed images." to -- packed images, --.

Signed and Sealed this

Thirteenth Day of December, 2005

JON W. DUDAS
*Director of the United States Patent and Trademark Office*